March 25, 1952 A. E. OSBORN 2,590,565
PIPE JOINT
Filed June 2, 1950
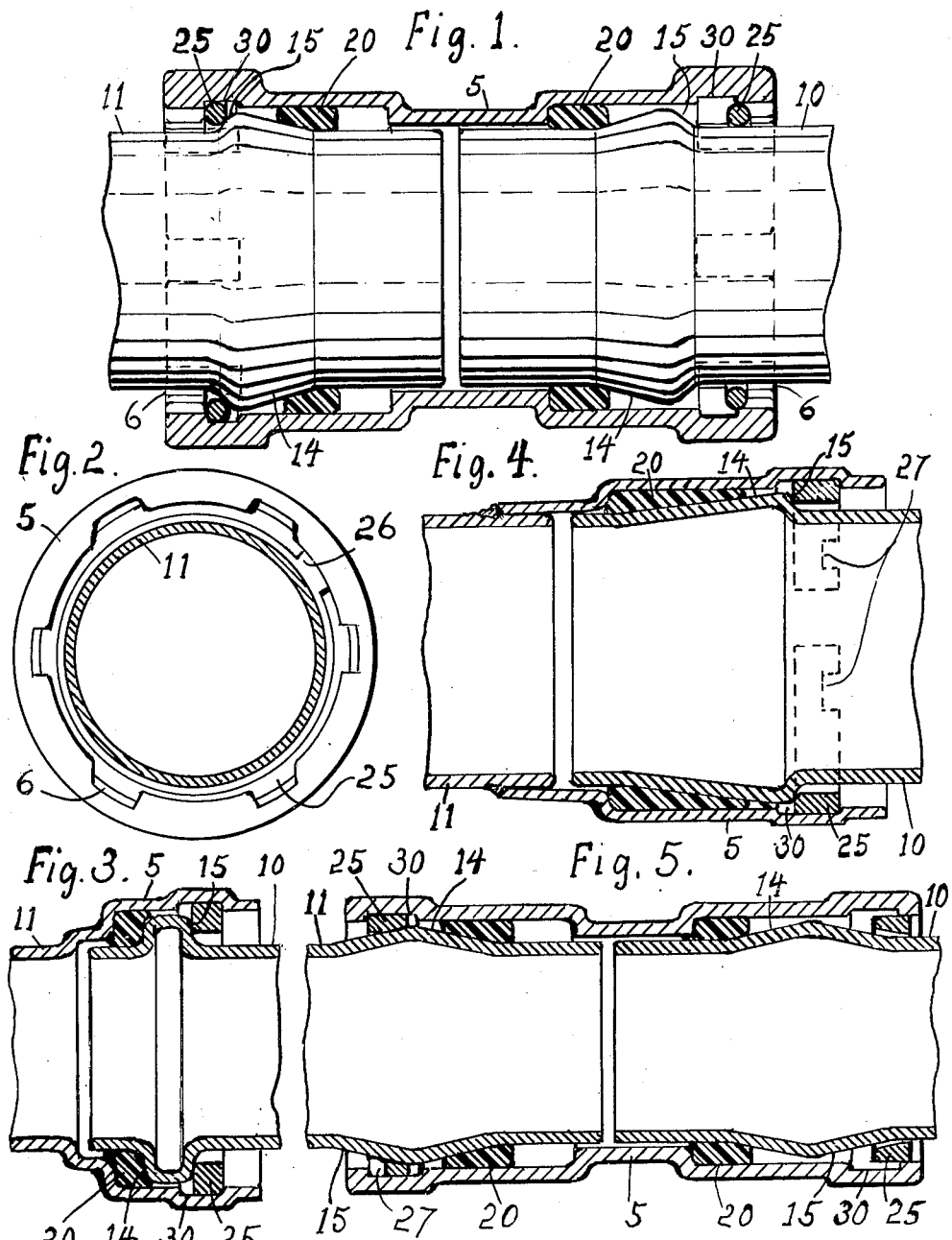
Inventor.
Alden E. Osborn.

Patented Mar. 25, 1952

2,590,565

UNITED STATES PATENT OFFICE 2,590,565

PIPE JOINT

Alden E. Osborn, Mount Vernon, N. Y.

Application June 2, 1950, Serial No. 165,781

10 Claims. (Cl. 285—196)

1

The object of my invention is to provide an improved joint or coupling means for a type of pipe having a collar or ridge near the end thereof of larger diameter than its adjacent outer surface, by which joint means the collared pipe can be easily connected, without the use of tools, into other pipes or fittings and is held securely into these pipes or fittings so that it cannot be forced or pulled out by internal pressure or external tension. It involves a locking means that is removable from the collared pipe and from the other pipe or fitting into which the collared pipe is to be connected, which locking means is inserted through a clearance between the collared pipe and the connected pipe or fitting and is expanded into its locking position after the collared pipe is in this connected member. My invention also provides a means whereby, after the pipe is in position in the joint, leakage from the joint is prevented by pressure of the contents of the pipe causing a packing within the joint to be automatically compressed against the pipe and surrounding joint parts. In accordance with my invention the packing gasket employed to prevent leakage through my joint is confined, without substantial initial compression, within a circumferential space, having immovable walls and of larger volume than the volume of the packing, which space is wider at one end than at the other so that said packing is finally compressed into operative condition by being moved into the narrower part of said space by fluid pressure against one of its surfaces. My invention further provides a means whereby the joint can be readily disconnected without the use of special tools.

It should be understood that while, throughout the following specification and claims, I have defined the members to be connected or to be fastened into the socketed pipes or fittings as pipes, these parts may be cylindrical members or tubes formed in various ways and of various materials. It should be further understood that the features illustrated in the different embodiments of my invention may be combined into a single pipe-joining means in various ways and that other modifications can be made within the scope of the appended claims.

In the accompanying drawing

Fig. 1 represents a longitudinal sectional elevation of a coupling embodying one form of my invention, Fig. 2 represents an end elevation of the coupling shown in Fig. 1, Fig. 3 represents a longitudinal sectional elevation of a pipe joint of the bell and spigot type

2 embodying a modification of my invention as shown in Fig. 1,

Fig. 4 represents a longitudinal sectional elevation of a modification of Figs. 1, 2 and 3, and Fig. 5 represents a longitudinal sectional elevation of a coupling embodying a still further modification of my invention.

In Fig. 1 my pipe joint is shown in the form of a coupling employed to fasten two pipes together although it can be arranged to attach pipes to other forms of fittings and also, as is shown in some of the other figures of my drawing, to connect the pipes directly together. In this Fig. 1 the pipes 10 and 11 are shown as provided with external collars having slanting sides 14 and 15, which collars are preferably formed by rolling or pressing outward a portion of the pipe adjacent to the ends to be coupled, altho the collar can be formed by other means and would be formed, in the case of cast pipe, when the casting is made. As shown in Fig. 1, each collar has a slanting surface 15 which engages split lock rings 25 that, in this figure, are shown as of round section and are of such a size that they can pass between ends of the coupling socket outside of the ring groove 30 and the outside of the pipes when they are compressed to a diameter to permit them to enter the coupling socket. When connecting a pipe to the coupling it is first fully inserted into the socket so that the collar portion of the pipe is further inside of the socket than the ring groove 30, which allows the locking ring 25 to go through the clearance between the inside of the socket end and the pipe and into the ring groove 30 without the pipe collar interfering with its passage. After the lock ring 25 is in place, a longitudinal pull on the pipe will bring the collar taper 15 against the ring and expand the ring firmly into the collar groove 30. The pipe is thus positively held in the coupling independently of the locking effect from the outward spring of the ring and cannot be removed without the pipe being again pressed into the coupling.

As thus described the joint would leak, especially at the opening (26 in Fig. 2) where the ring is split, and, in order to make my joint tight, I have provided a packing ring 20 between the interior wall of the socket and the end of the pipe. This ring 20, when the pipe is being pushed into position, would move toward the center of the coupling 5, as indicated at pipe 10 end of Fig. 1 but, as soon as the pipe is in the position it normally assumes when the joint is in use and pressure is exerted by the contents of the pipe upon the ring, the ring would be forced toward the slanting surface or taper 14 of the pipe, as shown in the pipe 11 end of this figure, and would be jammed tightly between this paper and the inside of the coupling socket and thus be made tight against leakage, the degree of tightness depending on the angle of the taper and the pressure within the pipe. These packing rings 20 can be inserted into the coupling 5 before the pipes 10 and 11 are placed in position or can be put on the ends of the pipes before they are put into the coupling.

This form of joint obviously can be very quickly assembled and, as in some cases it might also be desirable to provide for its quick disconnection, I have, in Fig. 2, a means whereby the disconnection of the pipe can be made without the use of special tools. This comprises forming an end of the coupling with the groove or keyways 6 extending back as far as the inside edge of the lock ring groove 30, these keyways being of such a depth that tools or even flat pieces of metal can be inserted into the keyways at right angles to the split 26 of the locking ring, and by using these tools as levers, the ring 25 can be reduced in size and sprung out of the ring groove 30 and out of the coupling, thus permitting the pipe to be removed from the coupling.

In Fig. 3 is shown a modification of Figs. 1 and 2, in that the pipe is provided with a collar having square side walls 14 and 15 and is without the taper action on either the lock ring 25 or the packing ring 20. In this view, my invention is shown as applied to a pipe joint of the bell and spigot type, altho it can also be used to connect pipes to couplings or fittings. The lock ring 25, in this form, is dependent mainly on its spring to hold it in position as, because of the packing washer allowing a relatively small inward movement of the pipe, it is not possible to have as long a taper surface 15 at the locking ring end of the collar without its interfering with the insertion of the ring. It is intended that, in this form of my device, the pipe 10 is to be pressed against the gasket when the lock ring 25 is being inserted with the gasket having sufficient spring to maintain tightness in the joint when the collar comes up against the lock ring and the pipe is in its final connected position.

In Fig. 4 is shown a further modification of my invention, also applied to a bell and spigot type of joint, which is a slight modification of Fig. 3 and differs from that figure in that the packing 20 is tightened by having a relatively long taper 14 on the packing side of the pipe collar. In this form it is also intended to press the pipe into position against the packing with considerable pressure before inserting the lock ring 25 and, because of the long taper, the packing would still be under pressure when the pipe collar surface 15 is allowed to become seated against the ring. In assembling both Figs. 3 and 4, the pipes could be pressed into position manually in many cases without the use of special tools, altho in some cases, a device similar to that employed in assembling the usual roll-on rubber gasket joints would be desirable, particularly if the pipes are large and considerable force is required. The lock ring 25, in this form of my invention, as shown by dotted lines, is provided wtih notches 27, so that it can be contracted, by means of a suitable pliers, in order to withdraw it from the groove 30 and disconnect the pipe.

Fig. 5 is a further modification of my invention in which relatively long tapers 14 and 15 are provided on the sides of the pipe collar. This is done in order that the pipes will lock in position thru friction so that it would be necessary to use pressure on the end of the pipe and push the pipe into the coupling or joint in order to unlock the joint and release same. The inner surface of the lock ring 25 is shown as tapered to correspond with the taper 15 on the pipe collar so that the pressure of the lock ring is distributed for a considerable area on the outside of the pipe at the collar. The packing 20 is shown as arranged to rest upon a portion 14 of the collar which is also in the form of a tapered surface of considerable length in order that the packing, after being forced into its normal position by pressure from inside the pipe, would remain in that position thru friction even tho a vacuum might later exist in the pipe. It will be noted that throughout the specification and claims the lock means is described as a ring and is, therefore, presumably in one piece, but it is obvious that it can be made of several separate pieces and still operate, especially when used with the construction of this Fig. 5. A single pieice self-expanding ring is, however, believed preferable as the separate pieces or segments of a divided ring would have to be held so that they would enter the internal ring groove of the socket member while being expanded into locking position by the action of the tapered wedge-surface 15 at the back of the pipe collar when the pipe is drawn outward.

I claim:

1. A joint for connecting a collared pipe, comprising a socket member into which an end of said pipe is inserted with the collar of said pipe within said socket, a circumferentially arranged shoulder in the interior of said socket surrounding said pipe on the opposite side of said collar from the end of said pipe, a separable expandable lock ring inserted into said socket after said collared pipe has been entered therein and, when expanded, positioned between the side of said pipe collar and said interior shoulder of said socket to retain said pipe in said socket, with said ring being contractable and removable from said socket while said pipe is still inserted therein, to release said pipe from said socket, and packing means, within said socket and between a wall of said socket and an exterior surface on said pipe, to prevent leakage thru said joint.

2. A joint for connecting a collared pipe, comprising a socket member into which an end of said pipe is inserted with the collar of said pipe within said socket, a circumferentially arranged shoulder in the interior of said socket and surrounding said pipe on the opposite side of said collar from the end of said pipe, and a separable expandable lock ring substantially surrounding said pipe and inserted into said socket by its longitudinal movement thru a clearance opening between the outer surface of said pipe and an internal surface of the socketed member adjacent to the end thereof, whereby said ring, after said insertion, is between said pipe collar and the internal shoulder of said socketed member, and, upon the expansion thereof, bears, at one side, against substantially the entire circumference of the collar of said pipe, and bears, at the other side, against substantially the entire circumference of said socket shoulder, and a packing means, within said socket and between a wall of said socket an exterior surface on said pipe, to prevent leakage thru said joint.

3. A joint for connecting a collared pipe comprising a socket member into which the end of said pipe is inserted with the collar of said pipe within said socket, a circumferentially arranged shoulder in the interior of said socket and surrounding said pipe on the opposite side of said collar from the end of said pipe, and a separable expandable lock ring substantially surrounding said pipe and inserted, by its longitudinal movement thru a circumferential opening between the outer surface of said pipe and the internal surface of the socketed member adjacent to the end thereof, into the socket between said pipe collar and said internal shoulder and, after said insertion, to expand, whereby one side thereof bears against substantially the entire circumference of said pipe collar and the other side thereof bears against substantially the entire circumference of said shoulder within said socket, and means on the surface of said pipe shoulder to positively hold said ring in its expanded position and into contact with said socket shoulder, with said means being operative when said pipe collar is in pressure contact with said ring and being inoperative when said pipe collar is removed from pressure contact with said ring by the longitudinal movement of said pipe, and a packing means, within said socket and between a wall of said socket and an exterior surface of said pipe, to prevent leakage thru said joint.

4. A joint for connecting a collared pipe, comprising a socket member into which an end of said pipe is inserted with the collar of said pipe within said socket, a circumferentially arranged shoulder in the interior of said socket and surrounding said pipe on the opposite side of said collar from the end of said pipe with the side of said collar adjacent to said shoulder having a tapered surface, and a separable expandable lock ring inserted into said socket after said collared pipe has been inserted therein, and when expanded, positioned between said tapered surface of said side of said pipe collar and said interior shoulder of said socket, whereby said expandable ring is forcibly expanded at the side of said interior shoulder by said tapered collared surface when pressure is exerted to withdraw said pipe from said socket, with said ring being contractible and removable from said socket while said pipe is inserted therein, only when said pipe is relieved of said withdrawal pressure, and a packing means, within said socket and between a wall of said socket and an exterior surface on said pipe, to prevent leakage thru said joint.

5. A joint for connecting a collared pipe comprising a socket member into which an end of said pipe is inserted with the collar of said pipe within said socket, whereby a circumferential space having rigidly positioned walls is formed by said pipe and said socket member, a shoulder in the interior of said socket and surrounding said pipe on the opposite side of said collar from the end of said pipe, and a separable expandable ring inserted into said socket after said pipe is positioned therein, and when expanded to be positioned between the side of said collar and said internal shoulder of said socket and being compressible and renewable from said socket while said pipe is mounted therein to release said pipe from said socket, and a packing means to prevent leakage from said joint comprising a packing ring in said socket and compressible to operative condition without relative movement between any wall surface bearing thereon by being moved longitudinally in said socket and forcibly compressed against said socket wall and the side of said collar adjacent to the end of said pipe upon fluid pressure being applied to a surface thereof.

6. A joint for connecting a pipe having a collar thereon with a tapered surface having its smallest diameter toward the adjacent end of the pipe and its largest diameter distant from said pipe end, to a member having a socket with a substantially cylindrical internal surface whereby, when said pipe is inserted into said member, a tapered circumferential space is formed by the angular relation of said tapered surface of said pipe collar to the cylindrical surface of said socket member with all said internal surfaces of said space rigidly positioned, a means cooperating with said collar to retain said pipe in said socket, and a packing means in said circumferential space and compressible therein to operative condition without any relative movement between the internal surfaces of said space by being bodily movable towards said narrow end of said space when pressure of the contents of said pipe is exerted upon a surface of said packing means to slide said packing means on said stationary surfaces of said pipe and said socket.

7. A joint for connecting a collared pipe comprising a socket member into which an end of said pipe is inserted with the collar of said pipe within said socket, whereby a circumferential space having rigidly positioned walls is formed by said pipe and socket member, a means cooperating with said collar to retain said pipe in said socket, a relatively loosely mounted packing means within said socket and fitting only a portion of the said circumferential space, and shiftable longitudinally along said pipe and along the internal surface of said socket upon fluid pressure being applied to a surface thereof, and means whereby, when said packing has moved by said pressure into its said pressure-actuated position, said packing is compressed independently of any movement of its confining surfaces and whereby said packing is retained in said position after the reduction of said fluid pressure comprising slanting the surface of said pipe collar to a relatively small angular relation to the socket member surface whereby said packing wedges between said surfaces.

8. A joint for connecting a collared pipe comprising a socket member into which an end of said pipe is inserted with the collar of said pipe within said socket whereby a circumferential space having rigidly positioned walls is formed by said pipe and said socket member, a shoulder in the interior of said socket and surrounding said pipe on the opposite side of said collar from the end of said pipe, and a separable expandable ring inserted into said socket after said pipe is positioned therein and, when expanded, positioned between the side of said collar and said internal shoulder of said socket, and being compressible and renewable from said socket while said pipe is mounted therein to release said pipe from said socket, and a packing means to prevent leakage from said joint, comprising a packing ring in said socket and compressible to operative condition without relative movement between any wall surface bearing thereon by being moved longitudinally in said socket and forcibly compressed against said socket wall and the side of said collar adjacent to the end of said pipe upon fluid pressure being applied to a surface thereof.

9. A joint for connecting a collared pipe, comprising a socket member into which the end of said pipe is inserted with the collar of said pipe within said socket, a circumferentially arranged shoulder in the interior of said socket and adapted to surround said pipe on the opposite side of said collar from the end of said pipe, and a lock ring adapted to substantially surround said pipe and to be inserted into said socket between said pipe collar and said internal shoulder after said collared pipe is in position in said socket, by the longitudinal movement thereof thru a circumferential opening between the outer surface of said pipe and the internal surface of the socket member adjacent to the end thereof, and to, after said insertion, expand, whereby one side of said lock ring bears against substantially the entire circumference of said pipe collar, and the other side thereof bears against substantially the entire circumference of said shoulder within said socket, and means for preventing leakage thru said joint comprising a circumferential space, having rigidly positioned internal wall surfaces, between said pipe and the socket member with said space being narrower at the end thereof farthest from the end of said pipe than at the end thereof adjacent to the end of said pipe, and a packing means in said circumferential space and slidable therein upon fluid pressure being applied to a surface thereof, whereby said entire packing means is moved longitudinally towards said narrow end of said circumferential space, and compressed therein notwithstanding said absence of relative movement between the various wall surfaces of said space.

10. A joint for connecting a collared pipe, comprising a socket member into which an end of said pipe can be inserted with the collar of said pipe within said socket, a circumferentially arranged shoulder in the interior of said socket and surrounding said pipe on the opposite side of said collar from the end of said pipe, and a separable expandable lock ring inserted into said socket after said collared pipe has been inserted therein, and when expanded, positioned between a side of said pipe collar and said internal shoulder of said socket, and means to enable the withdrawal of said ring while said pipe is in position in said socket, comprising keyways in said socket member and extending from the outer end of said socket member to the back of the outer surface of said ring, said keyways being adapted to permit the insertion of a tool means whereby said ring can be contracted and removed from said socket to release said pipe.

ALDEN E. OSBORN.

REFERENCES CITED

The following references are of record in the file of this patent:

UNITED STATES PATENTS

| Number | Name | Date |
|---|---|---|
| 865,497 | Kenyon | Sept. 10, 1907 |
| 1,949,451 | Brubatour | Mar. 6, 1934 |
| 2,040,155 | Shoemaker | May 12, 1936 |
| 2,108,265 | Martin | Feb. 15, 1938 |
| 2,341,164 | Shimek | Feb. 8, 1944 |

FOREIGN PATENTS

| Number | Country | Date |
|---|---|---|
| 39,091 | Netherlands | Jan. 31, 1934 |
| 107,280 | Australia | May 11, 1939 |